G. J. BANCROFT.
PNEUMATIC CUSHION FOR VEHICLES.
APPLICATION FILED JUNE 7, 1910.

1,003,579.

Patented Sept. 19, 1911.

2 SHEETS—SHEET 1.

Witnesses
Otto E. Hoddick.
C. H. Roessner.

Inventor
George J. Bancroft.
By C. J. O'Brien.
Attorney

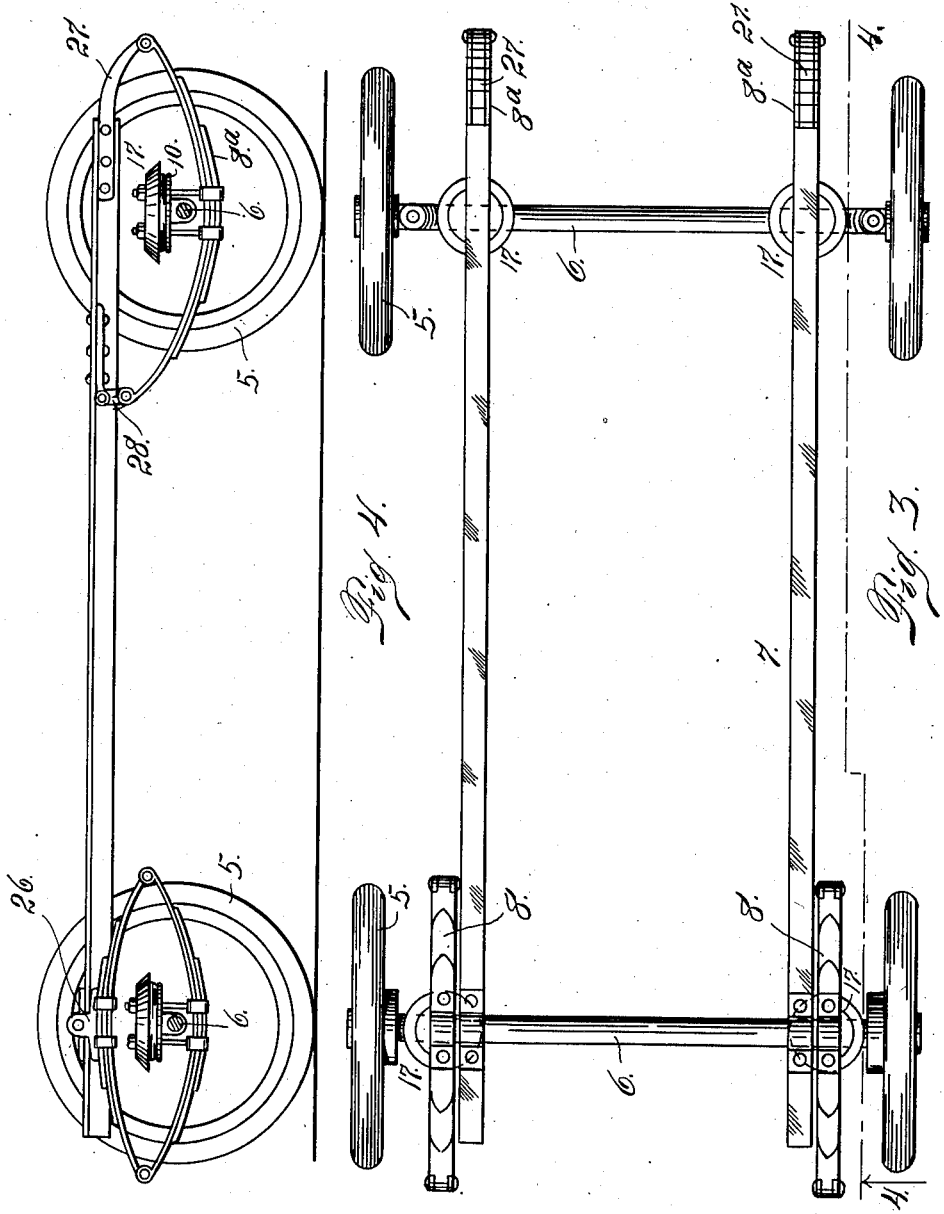

UNITED STATES PATENT OFFICE.

GEORGE J. BANCROFT, OF DENVER, COLORADO.

PNEUMATIC CUSHION FOR VEHICLES.

1,003,579.      Specification of Letters Patent.      Patented Sept. 19, 1911.

Application filed June 7, 1910. Serial No. 565,619.

*To all whom it may concern:*

Be it known that I, GEORGE J. BANCROFT, a citizen of the United States, residing in the city and county of Denver and State of Colorado, have invented certain new and useful Improvements in Pneumatic Cushions for Vehicles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in pneumatic cushions for vehicles, my object being to provide a construction of this class which shall make it practicable to use solid tires or cushions on automobiles or other vehicles. This I accomplish by interposing pneumatic cushions in the form of endless tubes, between pairs of opposing members, one individual member of each pair being connected with a spring of the vehicle while the other is supported by the axle thereof. The upper member of each pair is connected with a vehicle spring, while the lower member is carried by the adjacent axle. The upper member is inverted dish-shaped and adapted to engage the pneumatic tube at two points; while the lower member is conical or has the shape of the frustum of a cone whose base is provided with an extension flange lying in the same plane, whereby this lower member also has two points always in engagement with the pneumatic cushion.

Having briefly outlined my improved construction, I will proceed to describe the same in detail, reference being made to the accompanying drawing in which is illustrated an embodiment thereof.

Figure 1:
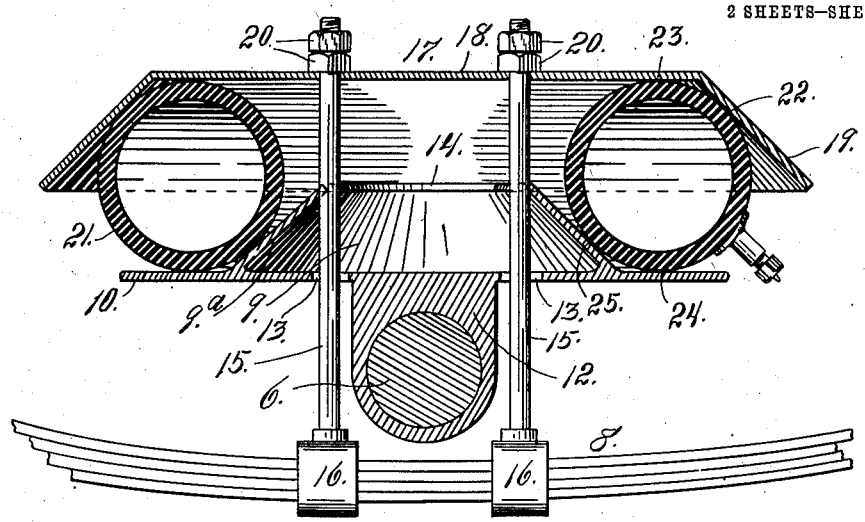
Figure 2:
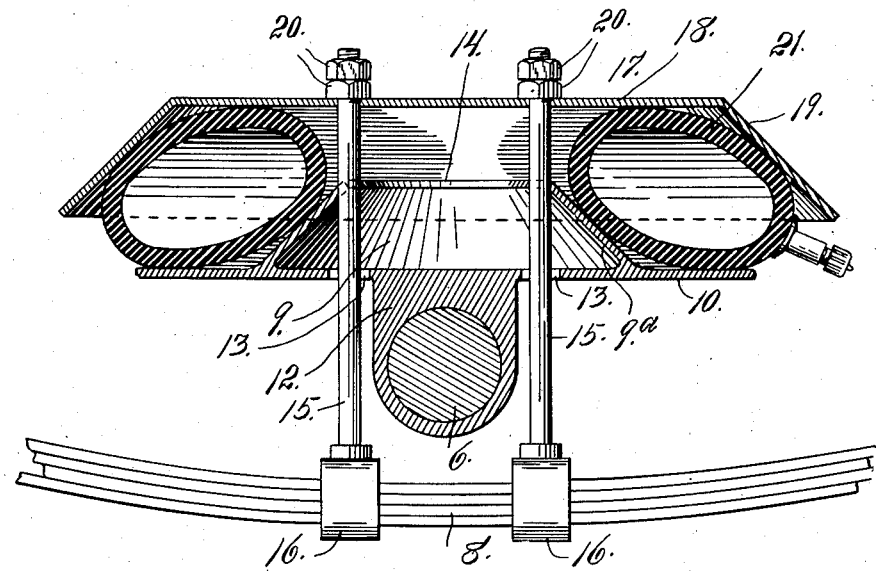

In this drawing: Figure 1 is a sectional view in detail illustrating my improved pneumatic cushion construction for vehicles, shown in connection with an axle and a spring thereof, the axle being shown in cross section. Fig. 2 is a similar section showing the cushion compressed. Fig. 3 is a top plan view of the running gear of a vehicle equipped with my improvement, which is shown on a smaller scale. Fig. 4 is a section taken on the line 4—4, Fig. 3, viewed in the direction of the arrow.

The same reference characters indicate the same parts in all the views.

Let the numeral 5 designate the wheels of a vehicle, 6 the axles, 7 the framework and 8 and 8ª the springs, all of these parts being of ordinary or any suitable construction.

Mounted upon each axle and extending above the same is a frustum-shaped member 9 having a horizontally disposed extension flange 10 surrounding the base. This frustum-shaped member has a depending bearing part 12 through which the axle 6 passes. It is also provided with bottom openings 13 and is also open at the top as shown at 14, these openings permitting the passage of rods 15 whose lower extremities are connected as shown at 16 with the spring 8 of the vehicle. To the upper extremities of these rods which protrude above the member 9, is secured an inverted dish-shaped member 17 having a horizontally disposed top part 18 and a downwardly and outwardly inclined part 19 which extends outwardly beyond the extension flange 10 of the member 9. Applied to the upper extremities of the rods 15 above the member 17 are nuts 20. Interposed between the members 9 below and 17 above, is a circularly arranged endless pneumatic tube 21, which as illustrated in the drawing has two points of contact 22 and 23 with the member 17, and two points of contact 24 and 25, with the member 9, the angle formed by the parts 18 and 19 of one member and the parts 9ª and 10 of the other member being so regulated as to produce this result. By virtue of this peculiar construction and arrangement of parts, the pneumatic tube is maintained in the proper position at all times. That is to say, its axis is never disturbed, since when under compression (see Fig. 2) it elongates inwardly and outwardly in equal degrees thus subjecting it to compression strain only, there being no tendency to expand the tube or stretch it by making it circularly larger.

From an inspection of Fig. 3 it will be understood that one of these cushion devices is mounted near the outer extremity of the axle, but it must be understood that they may be located at any desired points, since the invention is not limited to any particular number or arrangement of the pneumatic cushions. It will also be observed by an inspection of the drawing that in the construction illustrated, the springs 8 have one member extending below the axle of the vehicle, while the other member extends above the axle and above the cushion device, its upper member being secured to the body of the vehicle as shown at 26, these springs being of the elliptical form; while the springs 8ª are of semi-elliptical form, the main member extending below the front axle 6 while their outer extremities are connected with the body of the vehicle by auxiliary members 27 and 28.

Hence when the device is in use, as the springs are suspended from the body of the vehicle, they are allowed to move downwardly below the axle and as this occurs, the pneumatic cushions 21 are compressed, the degree of compression corresponding with the load upon the vehicle body and also upon the condition of the road over which the vehicle travels. The degree of inflation of these pneumatic tubes may be regulated according to the load upon the vehicle body and according to the degree of resilience or elasticity which should be afforded according to the use to which the vehicle is put.

It is evident that this cushion is exceedingly well adapted for use in cushioned vehicle bodies, especially when arranged as illustrated in the drawing.

From the foregoing description it will be understood that when my pneumatic cushions are applied to a vehicle, the upper members 17 are caused to vibrate and the loose fit of the suspension rods permit both the horizontal and vertical components of the cause of the vibration to be taken up solely by the pneumatic cushion thereby absorbing all jar.

Having thus described my invention, what I claim is:

1. The combination with the axle of a vehicle and a spring thereof having a member extending below the axle, of a cushion composed of a lower frustum-shaped member having an exteriorly-projecting horizontally disposed part, an upper coöperating inverted dish-shaped member, and means connected with the lower spring member, passing through the frustum-shaped member of the device and forming a support for the inverted dish-shaped member, the latter being free to vibrate vertically with the spring and supporting means, and an endless pneumatic tube interposed between the inverted dish-shaped member and the frustum-shaped member of the device, substantially as described.

2. The combination with a vehicle axle and a spring thereof having a member extending below the axle and transversely thereof, of a frustum-shaped member mounted directly upon the axle of the vehicle and extending above the same, the base of the said member having a horizontally disposed extension, an upper inverted dish-shaped member, rods connected with the lower spring member and extending upwardly through openings formed in the frustum-shaped member of the device, the said springs projecting above the last-named member, and forming a support for the body of the vehicle, and a pneumatic tube interposed between the dish-shaped member and frustum-shaped member of the device, substantially as described.

3. The combination with an axle, of a vehicle and a spring extending below the axle, the said spring being connected with the body of the vehicle, of a cushioning device consisting of a frustum-shaped member mounted directly upon the axle of the vehicle and extending above the same, the base of the said member having a horizontally disposed extension, an upper inverted dish-shaped member, a pneumatic tube interposed between the two members of the device, rods connected with the spring member passing beneath the axle of the vehicle, the said rods extending through the frustum-shaped member of the device and connected with the inverted dish-shaped member, the inverted dish-shaped member being free to vibrate vertically with the spring.

4. The combination with a vehicle axle and a spring thereof having a portion extending below the axle, of a cushion composed of a frustum-shaped member having a horizontal flange extending outwardly from the lower extremity of its inclined wall, an upper inverted dish-shaped member having a horizontally disposed top and a downwardly and outwardly flared part, the inverted dish-shaped member being supported from the spring member below the axle, and an endless pneumatic tube interposed between the frustum-shaped member and the inverted dish-shaped member, the angles of the parts of the two members of the device being arranged to produce even compression of the pneumatic tube without disturbing the location of its axis, substantially as described.

In testimony whereof I affix my signature in presence of two witnesses.

GEORGE J. BANCROFT.

Witnesses:
  A. J. O'BRIEN,
  HORTENSE UHLRICH.